United States Patent [19]

Warner

[11] Patent Number: 4,681,610
[45] Date of Patent: Jul. 21, 1987

[54] HIGH PERFORMANCE WATER COLLECTOR

[75] Inventor: John L. Warner, Simsbury, Conn.

[73] Assignee: United Technologies Corporation, Hartford, Conn.

[21] Appl. No.: 829,049

[22] Filed: Feb. 13, 1986

[51] Int. Cl.⁴ ............................................. B01D 45/12
[52] U.S. Cl. ...................................... 55/394; 55/338; 55/456
[58] Field of Search ................. 55/392, 391, 394, 456, 55/457, 431, 338, 461

[56] References Cited

U.S. PATENT DOCUMENTS

| 2,193,883 | 3/1940 | Reeves | 55/396 |
| 3,339,349 | 9/1967 | Farnum | 55/309 |
| 3,362,155 | 1/1968 | Driscoll | 55/392 |
| 3,834,126 | 9/1974 | DiMinno, Jr. | 55/210 |
| 3,925,045 | 12/1975 | Cheng | 55/391 |
| 4,187,090 | 2/1980 | Bizzarro et al. | 55/269 |
| 4,430,867 | 2/1984 | Warner | 62/402 |

FOREIGN PATENT DOCUMENTS

| 2702148 | 7/1978 | Fed. Rep. of Germany | 55/457 |
| 628212 | 8/1949 | United Kingdom | 55/457 |

Primary Examiner—Bernard Nozick
Attorney, Agent, or Firm—Lloyd D. Doigan

[57] ABSTRACT

A high performance water collector (1) dries a moisture-laden airstream within a duct (7) by providing an air guide (20) with a gap (12) between a collector inlet section (4) and discharge section (6). The guide (20) defines a scupper (26) to direct the heavily moisture-laden air to a diffuser (14) surrounding the gap (12). The diffuser (14) slows the air, causing the water to fall naturally within the diffuser (14) for subsequent removal. The guide (20) further defined an ejector (28) for infusing the dried air back into the duct.

8 Claims, 3 Drawing Figures

HIGH PERFORMANCE WATER COLLECTOR

TECHNICAL FIELD

This invention relates to a water collector.

BACKGROUND ART

The cool airstream discharged from the condensing heat exchanger of an air cycle air conditioning system for aircraft, carries droplets of moisture which are generally removed by a water collector.

Unless the moisture is removed from the airstream, these droplets, when discharged into the cabin of the aircraft, create a foggy or misty atmosphere, or on occasion, freeze into ice. Further, system heat exchangers, turbines and ducting may be clogged by the buildup of ice, thereby reducing system efficiency and eroding system components.

Typically, the water to be removed is concentrated on the duct walls upstream from the water collector due to a type of centrifugal separation effected by the tortuous course the ducts follow. Therefore, that portion of the airstream closest to the duct walls carries the highest concentration of water. Prior art collectors have proven somewhat ineffective in removing this heavily moisture-laden air from the mainstream of the airflow.

One such prior art system employs a ring-like container around an annular gap in an air duct to collect the water moving on the duct walls. Since there is no outlet in the container, moisture-laden air fills the container, creating a higher pressure area therein, thereby forcing the water formed on the duct walls to cross the gap over the higher pressure air. While such a system may remove most of the water from a relatively slowly moving airstream (13.7 meters per second), it may not be capable of sufficiently drying a higher speed airstream (18.3 to 30.5 meters per second) typical of modern air cycle refrigeration systems. At such higher airflow speeds, a serial arrangement of several gaps and containers may be necessary to effectively dry the airstream, thereby rendering the system cumbersome.

The system disclosed in U.S. Pat. No. 3,834,126 granted to Philip J. Diminno, Jr. is an improvement to the above-noted prior art system. Like the abovenoted system, the Diminno, Jr. system has an annular gap provided in an air duct and surrounded by a container to collect the water moving on the duct walls. However, the Diminno, Jr. system also employs vent tubes between the duct and the container, upstream of the gap to lower the air pressure in the container, thereby inducing the airflow and water to travel therethrough. However, in certain applications, airflow through the container may not be sufficient to inhibit the water from crossing the gap. Indeed, this patent indicates that water droplets may be carried beyond the gap, risking the retention of excessive, unwanted water in the airstream.

Accordingly, a high performance water collector of enhanced efficiency, for extracting water from a high speed airstream exhausted from an air cycle refrigeration system turbine, is desirable.

DISCLOSURE OF INVENTION

In accordance with the present invention, an improved water collector employs a scupper for separating from an airstream, the most moisture-laden portion thereof; a diffuser which lowers the pressure and slows the separated portion to cause moisture to fall out naturally therefrom; and an ejector downstream of the scupper and diffuser, through which the dried air is returned to the airstream. In the preferred embodiment, the scupper is disposed at a radially outer portion of a duct accommodating the airstream, so that the flow of relatively dry air centrally of the duct is generally unaffected. For structural simplicity, the scupper may be integral with an inlet to the diffuser while the ejector may be integrally formed with the diffuser's outlet.

The improved water collector has the following advantages. Moisture-laden air cannot cross the gap as it is removed from the mainstream. No air pressure in the refrigeration system is lost because the air dried in the diffuser is drawn back into the main airstream through the ejector downstream of the scupper. Water is collected in a highly efficient manner. The collector is characterized by structural economy with a minimum of parts.

Other objects, features and advantages of this invention will become apparent in light of the teachings and the following description of the invention and accompanying drawings.

BEST MODE FOR CARRYING OUT THE INVENTION

Figure 1:
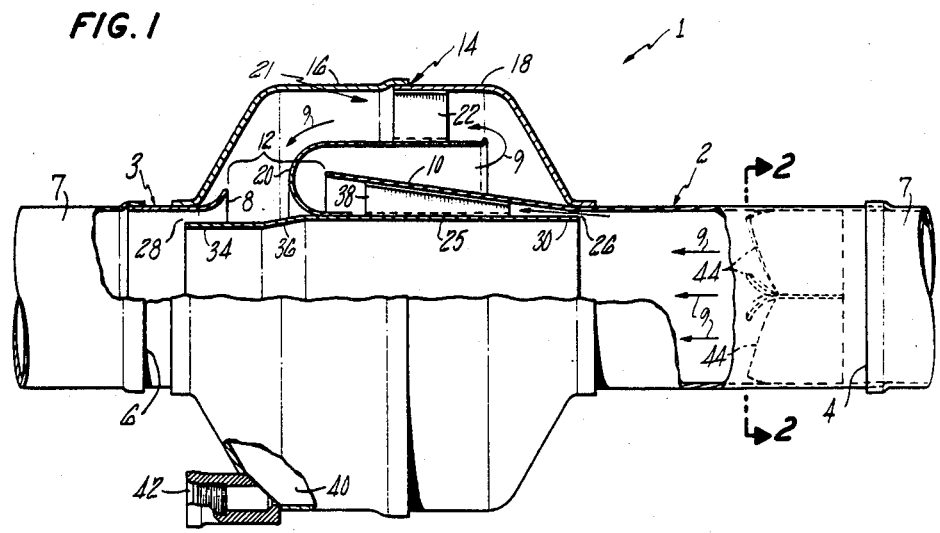
FIG. 1 is a elevation of the water collector of the present invention.

Referring to the drawings, the present invention comprises a water collector 1 having inlet and outlet portions 2, 3 communicating at inlet section 4 and discharge section 6 respectively thereof with sections of an air duct 7 within which the collector is disposed. Duct 7 will, for purposes of illustration, be assumed to be the condensing heat exchanger discharge line of an air cycle air conditioning system, accommodating a flow of chilled, moisture-laden air at speeds of from 18.3 to 30.5 meters per second. Typically, the inlet section of the duct may be from 2.5 to 12.7 centimeters in diameter, although 3.2 to 6.4 centimeters is fairly representative. As in the inlet section, the discharge section of the duct may be from 2.5 to 12.7 centimeters in diameter with 3.2 to 6.4 centimeters being fairly typical.

The outlet portion 3 includes an outwardly flared free end 8. The outward flare is oriented against the airstream flow represented by arrows 9 within the collector. The inlet portion 2 has a wall section 10 which uniformly and continuously diverges in the direction of the airflow at an angle of between 5°–12° from the direction of the airflow with 10° being preferred for a higher speed airstream. A gap 12 is defined by flared end 8 of the outlet portion and a free end 11 of the diverging wall section 10 of the inlet portion 2.

For the purpose of decelerating a flow of moisture-laden air, an annular air diffuser 14 concentrically surrounds, and is attached to the inlet and outlet portions 2 and 3 respectively, thereof. The outer diffuser wall may be constructed in segments 16, 18 for ease of assembly. An outer section of the diffuser 14 defines a settling chamber 21 in which the moisture within the decelerated airstream falls naturally therefrom. The diffuser 14 in conjunction with an air guide 20 described hereinafter, defines a tortuous, Z-shaped course from the angled wall 10.

Annular air guide 20 has a U-shaped cross section and is disposed within gap 12, part of the air guide protruding into the airstream of the inlet portion and part extending into the diffuser 14. The air guide is attached to the inner surface of an outer wall of the diffuser section by means of a plurality of circumferentially spaced webs (one of which is shown at 22) disposed parallel to the direction of the airflow. The Z-shaped course defined by the air guide and outer diffuser wall provides a long flow path of gradually increasing volume to allow a significant airstream deceleration within relatively short axial and radial dimensions while minimizing pressure losses as the air flows into the main body of the diffuser.

A guide duct 25 is attached to the air guide within the first duct and extends upstream from the guide, defining with the inlet portion 2, a narrow scupper 26 at its upstream end 30. A medial portion of guide duct 25 defines an upstream (radially inner) portion 32 of diffuser 14. The guide duct also extends downstream from the guide to define an ejector 28 between the outlet portion 3 and the second duct. A portion 36 of the second duct is tapered inwardly in a downstream direction to accelerate the airstream flowing therewithin to pull the dried air from the diffuser 14 through the ejector 28. The guide duct 25 is mounted to the wall section 10 at a plurality of circumferentially spaced webs (one of which is shown at 38) which are attached at a medial portion of the guide duct, at radially opposed edge portions of the webs by any suitable fastening or bonding technique. The guide duct 25 is arranged so as to baffle the gap 12 between the inlet portion 2 and the outlet portion 3. Typically, the width of the ejector 18 is between 1.5 to 4.7 millimeters. A width of approximately 3.2 millimeters is ideal for higher speed airstreams. The scupper 26 is between 1.5 to 2.5 millimeters wide with 2.0 millimeters being ideal for higher speed airstreams.

A water reservoir 40 and drain 42 are provided at the bottom of the diffuser 14. The placement of the drain depends generally on the angular orientation of the reservoir to allow for gravitational drainage.

The guide duct 25, the air guide 20, and the diffuser 14 may be constructed of any suitable metal or plastic. High strength aluminum, however, is preferred.

During operation, air flows through the collector 1 from the inlet portion 2 to the outlet portion 3. Typically, water, concentrated on the inlet portion walls due to the centrifugal separation noted above, migrates along the inlet portion walls, driven by the airflow. The scupper separates the water and the moisture-laden air adjacent the inlet portion wall from the main airstream. The separated water and air flow outside the guide duct 25 into the diffuser 14. Due to the expanding volume along the flow path of the Z-shaped course within of the diffuser 14, the airflow is slowed to below 3 meters per second and the pressure drops slightly causing the water droplets in the settling chamber 21 to fall naturally into the water reservoir 40 for subsequent drainage through drain 42. Any water droplets remaining on the inner diffuser walls of segments 16 and 18 are driven along those walls by the airflow until the droplets are trapped between flared end 8 and diffuser segment 16 where they fall into the reservoir 40. The water is then used for cooling or cleaning, or expelled.

The air not separated by the scupper 26 is accelerated slightly within the guide duct by the slight taper provided by section 36. The accelerated air passes the ejector 28, pulling the dried, slowly moving air from the diffuser 14. This pulling phenomenon also induces more air to flow through the scupper 26 ensuring that the water on the walls and the heavily moisture-laden air passes through the diffuser 14 without creating a high pressure area in the diffuser that would otherwise inhibit water collection. The diffuser 14, and the ejector 28 cooperate to ensure that the air passing through the scupper 26 and the diffuser 14 is not lost from the air cycle refrigeration system and that there is a minimum pressure drop across the collector. The collector effectively removes more than 99% of the moisture on the walls and in the air.

Figure 2:
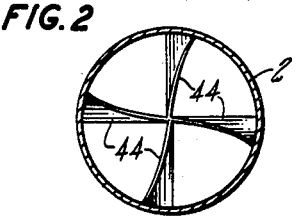
FIG. 2 is a partial section taken along line 2—2 of FIG. 1.
Figure 2:
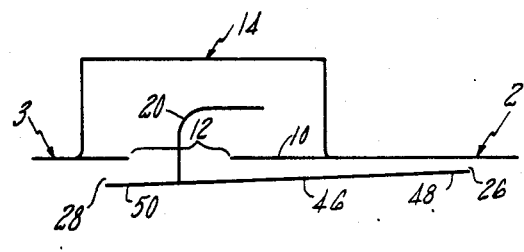

In the event that the moisture is not concentrated adjacent the inlet portion 2 walls due to, for example, insufficient bending of the walls, the heavily moisture-laden air and the water droplets may be directed to the walls of the inlet portion by swirl vanes 44, attached to the inlet portion. The vanes, as seen in FIG. 2, are configured with a minimum amount of turning to minimize pressure drop with considerable backward sweep to provide a surface to direct water droplets forming on the vanes 44, to the inlet portion wall.

Figure 3:
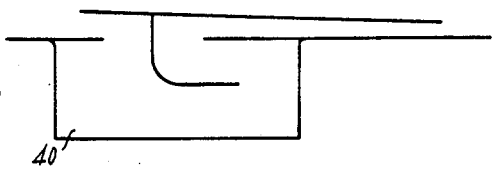
FIG. 3 is a schematic elevation of a further embodiment of the present invention.

In an alternate embodiment as shown in FIG. 3, the wall 10 of the first duct does not diverge. The guide duct 46, however, diminishes continuously in diameter from a maximum diameter at its input end 48 to a minimum diameter 50 at its output end, thereby forming a truncated cone. The guide duct diminishes at an angle of between 5°–12° from the direction of the airflow with 10° being typical for higher speed airstreams. The cone-shaped guide duct 46 accelerates the air passing within, to help pull the dried air in the diffuser 14 through the ejector 28.

The water collector of the present invention is extremely effective, removing more than 99% of the water in the air moving at speeds of up to 30.5 meters per second. The collector is characterized by structural economy with a minimum number of parts. No high pressure or turbulent zones are created in the removal of moisture-laden air from the main flow. Flow losses are minimized as the air dried in the diffuser is drawn back into the mainstream flow by the ejector.

It should be understood that this description of the invention is intended to enable those skilled in the art to practice the invention and that various changes and additions may be made thereto without departing from the spirit and scope of the invention. Particularly, one of ordinary skill in the art would note, that, upon the removal of the guide duct 25, a scupper is formed between an upstream side of air guide 20 and the diverging wall 10, and an ejector is formed between a downstream side of air guide 20 and the flared free end 8 of outlet portion 3. Likewise, various other changes may be suggested by the disclosure herein, and it is intended by the following claims to cover any such other changes.

Having thus described the invention, what is claimed is:

1. Apparatus, adapted for mounting in a duct having an upstream portion and a downstream portion, for drying a moisture-laden portion of an airstream flowing through said duct, said apparatus being adapted for use with centrifugal separation means for concentrating said moisture-laden portion along walls of said duct, said apparatus comprising:

an inlet conduit portion attached to said upstream portion of said duct said airstream passing through said inlet conduit portion from said upstream portion, an outlet conduit portion attached to said downstream portion of said duct said airstream passing through said outlet conduit portion from said inlet conduit portion to said downstream portion, a diffuser chamber means for drying said moisture-laden portion, said diffuser means surrounding and attached to a portion of said inlet conduit portion and a portion of said outlet conduit portion said diffuser chamber means being in communication with said airstream, and guide means, extending into said diffuser chamber means and extending into said airstream, said guide means passing said moisture-laden portion from said airstream into said diffuser chamber means, said guide means guiding said moisture-laden portion along a reversing flow path within said diffuser chamber to remove moisture from said moisture-laden portion and said guide means passing a dried portion from said diffuser chamber means to said outlet portion.

2. Apparatus of claim 1 wherein said guide means is characterized by a ring having a U-shaped cross section with a first leg extending into said airstream and a second leg extending into said diffuser.

3. Apparatus of claim 1 wherein said flow path increases in volume therealong whereby said velocity of said separated moisture-laden portion is reduced to remove moisture from said separated moisture-laden portion.

4. Apparatus of claim 3 wherein said flow path substantially reverses direction at least two times.

5. Apparatus of claim 3 wherein said guide means is characterized by a ring having a U-shaped cross section with a first leg extending into said airstream and a second leg extending into said diffuser.

6. Apparatus of claim 5 wherein said inlet portion diverges radially outwardly towards said outlet portion.

7. Apparatus of claim 5 wherein said guide means is further characterized by a duct disposed within said inlet portion and said outlet portion and attached to said first leg.

8. Apparatus of claim 7 wherein said second duct tapers radially inwardly toward said outlet portion.

* * * * *

UNITED STATES PATENT AND TRADEMARK OFFICE
CERTIFICATE OF CORRECTION

PATENT NO. : 4,681,610
DATED : 7/21/87
INVENTOR(S) : John L. Warner

It is certified that error appears in the above-identified patent and that said Letters Patent is hereby corrected as shown below: Title page:

| | |
|---|---|
| In the Abstract, line 3. | Cancel "with" and substitute -- within -- |
| In the Abstract, line 9. | Cancel "defined" and substitute -- defines -- |
| Column 3, line 24. | Cancel "second" and substitute -- guide -- |
| Column 3, line 58. | Cancel "of" |

Signed and Sealed this

Twenty-fourth Day of January, 1989

Attest:

DONALD J. QUIGG

*Attesting Officer*      *Commissioner of Patents and Trademarks*